(12) United States Patent
Zimmermann et al.

(10) Patent No.: US 11,760,408 B2
(45) Date of Patent: Sep. 19, 2023

(54) STEERING GEAR MECHANISM AND STEERING SYSTEM FOR A MOTOR VEHICLE

(71) Applicant: Robert Bosch GmbH, Stuttgart (DE)

(72) Inventors: Martin Zimmermann, Schwaebisch Gmuend (DE); Jens-Uwe Hafermalz, Waeschenbeuren (DE); Dennis Fuechsel, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 17/279,328

(22) PCT Filed: Sep. 18, 2019

(86) PCT No.: PCT/EP2019/074934
§ 371 (c)(1),
(2) Date: Mar. 24, 2021

(87) PCT Pub. No.: WO2020/074223
PCT Pub. Date: Apr. 16, 2020

(65) Prior Publication Data
US 2022/0001917 A1 Jan. 6, 2022

(30) Foreign Application Priority Data
Oct. 12, 2018 (DE) ...................... 10 2018 217 459.8

(51) Int. Cl.
*B62D 5/04* (2006.01)
*F16C 19/06* (2006.01)
*F16H 55/24* (2006.01)

(52) U.S. Cl.
CPC ......... *B62D 5/0409* (2013.01); *B62D 5/0403* (2013.01); *F16C 19/06* (2013.01);
(Continued)

(58) Field of Classification Search
CPC ..... B62D 5/0409; B62D 5/0454; F16C 19/06; F16C 2326/24; F16H 55/24
See application file for complete search history.

(56) References Cited

U.S. PATENT DOCUMENTS

| 6,527,642 B1 | 3/2003 | Arai et al. |
| 2004/0222036 A1* | 11/2004 | Berhard ............... B62D 5/0409 180/444 |

(Continued)

FOREIGN PATENT DOCUMENTS

| CN | 102770327 A | 11/2012 |
| CN | 105164000 A | 12/2015 |

(Continued)

OTHER PUBLICATIONS

International Search Report corresponding to PCT Application No. PCT/EP2019/074934, dated Dec. 19, 2019 (German and English language document) (5 pages).

*Primary Examiner* — Tony H Winner
(74) *Attorney, Agent, or Firm* — Maginot, Moore & Beck LLP

(57) ABSTRACT

A steering gear mechanism is disclosed for a steering system of a motor vehicle including at least a housing, a gear wheel, a pinion intermeshing with the gear wheel and a pinion shaft comprising the pinion. The pinion shaft is mounted on one side of the pinion in a fixed bearing, which includes a pivot bearing, in which the pinion shaft is received. The pivot bearing itself is received in a fixed bearing sleeve. The fixed bearing comprises a pivot ring, which has an outer ring and an inner ring, which are connected to each other by way of one or more torsion webs in such a manner that pivoting about a pivot axis defined by the one or more torsion webs is enabled, the inner ring being received in the fixed bearing sleeve and the outer ring being mounted within the housing.

10 Claims, 3 Drawing Sheets

(52) U.S. Cl.
CPC ........... *F16H 55/24* (2013.01); *B62D 5/0454* (2013.01); *F16C 2326/24* (2013.01)

(56) References Cited

U.S. PATENT DOCUMENTS

| | | | | |
|---|---|---|---|---|
| 2014/0352467 | A1* | 12/2014 | Kwon | B62D 5/0409 74/400 |
| 2015/0059506 | A1* | 3/2015 | Kwon | F16C 25/06 74/425 |
| 2016/0101808 | A1* | 4/2016 | Tomizawa | B62D 5/0409 180/444 |
| 2016/0201760 | A1* | 7/2016 | Kwon | F16H 55/24 74/409 |
| 2017/0210412 | A1* | 7/2017 | Segawa | F16C 25/06 |
| 2018/0304915 | A1* | 10/2018 | Kawamura | F16H 1/16 |

FOREIGN PATENT DOCUMENTS

| | | |
|---|---|---|
| DE | 101 61 715 A1 | 6/2003 |
| DE | 10 2008 001 878 A1 | 11/2009 |
| DE | 10 2013 104 521 A1 | 11/2014 |
| DE | 10 2016 121 393 A1 | 5/2018 |
| DE | 10 2017 211 461 A1 | 1/2019 |
| EP | 2 345 569 A1 | 7/2011 |
| EP | 2 513 503 A1 | 10/2012 |
| JP | 2004-249767 A | 9/2004 |
| WO | 2017/153083 A1 | 9/2017 |

* cited by examiner

STEERING GEAR MECHANISM AND STEERING SYSTEM FOR A MOTOR VEHICLE

This application is a 35 U.S.C. § 371 National Stage Application of PCT/EP2019/074934, filed on Sep. 18, 2019, which claims the benefit of priority to Serial No. DE 10 2018 217 459.8, filed on Oct. 12, 2018 in Germany, the disclosures of which are incorporated herein by reference in their entirety.

The disclosure relates to a steering gear mechanism for a steering system of a motor vehicle and a steering system having such a steering gear mechanism. The steering system may in particular be a power-assisted steering system.

BACKGROUND

In most motor vehicles, power-assisted steering systems which during steering produce a supporting torque and thereby reduce the torque which has to be applied to the steering column by the driver are installed.

The known power-assisted steering systems are based on a steering gear mechanism which translates the drive power of a hydraulic or electric steering motor and which, for example, transmits it to the steering column. Such steering gear mechanisms are generally constructed in the form of a screw rolling gear mechanism and in particular as a helical gear mechanism or as a worm gear mechanism. These gear mechanisms comprise a gear which is directly or indirectly connected to the steering column and a pinion which meshes therewith and which is driven by the steering motor via a shaft.

A problem with such steering gear mechanisms has been found to be gear play which, as a result of component tolerances, forms different thermal expansions of the gear mechanism elements, as a result of wear and/or as a result of settlement of the material in gears of plastics material. In particular with a so-called alternating steering action, that is to say, with a directly successive steering action with an alternating steering angle direction, such a gear play produces undesirable noises, which result from the alternating application against opposing flanks of the teeth of the pinion and gear.

It is known to eliminate this gear play by the pinion shaft being pivotably supported about an axis which extends perpendicularly to the longitudinal axis of the pinion shaft and with spacing from the tooth engagement of the pinion and gear and being pressed by means of one or more resilient elements against the gear. The pivotability of the pinion shaft is in this instance generally integrated in one of the two bearings via which the pinion shaft is supported at the end side. This bearing is referred to as a fixed bearing. The bearing in the region of the other end is then configured with a defined movability (so-called movable bearing) in order to enable the deflection which is involved with such a pivoting movement. The fixed bearing may in particular be provided at the drive side, whilst the movable bearing is provided at the free end of the pinion shaft. The resilient element(s) for pressing the pinion against the gear may in this instance be integrated both in the movable bearing and in the fixed bearing.

Such a steering gear mechanism, in which the resilient force for the resilient application is produced by means of the fixed bearing, is known, for example, from EP 2 513 503 B1. A steering gear mechanism in which the resilient force for the resilient application is produced in contrast in the region of the movable bearing is known, for example, from DE 10 2008 001 878 A1.

An object of the disclosure is to provide an improved steering gear mechanism for a motor vehicle which in particular enables the most optimum possible resilient application of the pinion shaft for the respective application.

This object is achieved with a steering gear mechanism as described below. A steering system with such a steering gear mechanism is also described below. Advantageous embodiments of the steering gear mechanism according to the disclosure and consequently of the steering system according to the disclosure are set forth below and/or are derived from the following description.

SUMMARY

A steering gear mechanism according to the disclosure for a steering system of a motor vehicle comprises at least a housing, a gear, a pinion which meshes with the gear, in particular a helical pinion, and a pinion shaft which comprises the pinion. The pinion shaft is in this instance supported at one side of the pinion in a fixed bearing, which comprises a rotary bearing (preferably a roller bearing, in a particularly preferred manner a ball bearing) in which the pinion shaft is received. The rotary bearing itself is received in a fixed bearing sleeve. The fixed bearing further comprises a pivot ring which has an outer ring and an inner ring which are connected to each other by means of one or more torsion webs so as to be able to be pivoted about a pivot axis which is defined by the torsion web(s), wherein the inner ring is received in the fixed bearing sleeve and the outer ring is supported inside the housing, in particular directly or indirectly in or on the housing. The pinion shaft is preferably supported at the other side of the pinion in a movable bearing, which comprises a rotary bearing, in which the pinion shaft is received, wherein for the rotary bearing of the movable bearing a movability inside the housing is ensured with respect to the pivoting movability of the pinion shaft which is guided by the fixed bearing.

Furthermore, a steering gear mechanism according to the disclosure comprises an adjustment device by means of which the position of the outer ring of the pivot ring of the fixed bearing can be adjusted (that is to say, can be changed, wherein a plurality of positions can be fixed) within the housing at least (preferably exclusively) with respect to the directions which are orientated perpendicularly to the longitudinal axis of the outer ring and perpendicularly to the pivot axis. The adjustability can in this instance be produced only once or preferably several times, in particular as often as desired. As a result of the displaceability of the outer ring of the pivot ring which is involved with the adjustability of the position of the outer ring, in combination with the support of the pinion shaft on the gear a selective influence of the torsion of the torsion web(s) and consequently the resilient application of the pinion shaft against the gear can be produced. This enables the steering gear mechanism to be adapted in the most optimum manner possible to a specific application in a motor vehicle and consequently enables the most optimum resilient application possible for the pinion shaft to be produced. Such an optimum resilient application prevents, on the one hand, excessive friction in the tooth arrangement between the pinion and gear and consequently a sub-optimal steering behavior in the event of resilient application with excessively powerful resilient force and, on the other hand, undesirable noise generation as a result of a resilient application with an excessively low resilient force.

The adjustability of a steering gear mechanism according to the disclosure is particularly significant during use in different steering systems and/or motor vehicles since the steering behavior is not dependent exclusively on the configuration of the steering gear mechanism itself, but also in principle on the structure of the steering system/motor vehicle. A steering gear mechanism according to the disclosure can consequently be adapted in the simplest manner possible to different applications.

According to an embodiment of a steering gear mechanism according to the disclosure which is advantageous from a structural point of view, there may be provision for the adjustment device to comprise a (first) bearing journal whose longitudinal axis is orientated perpendicularly to the longitudinal axis of the outer ring and to the pivot axis and which connects the outer ring of the pivot ring to a bearing location of the housing, wherein the bearing location comprises means for fixing the bearing pin in different positions with respect to the longitudinal axis thereof. In this instance, these means for fixing the bearing pin may in particular comprise a threaded element which has a thread which cooperates with a counter-thread of the bearing location, in particular a counter-thread, which is directly integrated in the housing. As a result of a rotation of the threaded element, it is consequently displaced within the housing, wherein the movement of the threaded element is transmitted to the bearing pin and from there to the outer ring of the pivot ring. If the threaded element is not rotated, it fixes the adjusted position of the outer ring within the housing.

Such a screwable adjustability of the position of the outer ring provides an advantageous way of producing a repeated adjustability which can in particular be carried out as often as desired since, on the one hand, as a result of a simple rotational movement of the threaded element, a displacement of the outer ring of the pivot ring can be produced, whilst, on the other hand, the threaded connection fixes an adjusted position of the outer ring as a result of self-locking resulting from the friction in the thread pairing when the threaded element is not rotated. Of course, this does not exclude an adjusted position of the outer ring additionally being retained in a secure manner by additional threaded securing means, for example, an adhesively acting threaded securing means or a counter-threaded element being used.

Additionally or alternatively, a fixing of a previously adjusted position of the outer ring of the pivot ring may also involve other fixing means, for example, by a clamping fixing of the (first) bearing journal in the bearing location of the housing. In this instance, such a clamping fixing of the (first) bearing journal may be releasable or non-releasable. For a releasable fixing, this may be expanded in a changeable manner, for example, by means of a screw element which can be screwed into the (first) bearing journal. For a non-releasable fixing, in contrast, there may be provision for the (first) bearing journal to be plastically deformed and in this instance expanded in order to produce a clamping fixing within the bearing location.

In order to produce the most advantageous possible support of the loading of the outer ring of the pivot ring resulting in particular from the torsion of the torsion webs, according to a preferred development of such a steering gear mechanism according to the disclosure there may further be provided a second bearing journal which is arranged radially or diametrically opposite the first bearing journal with respect to the longitudinal axis of the outer ring and which is supported axially with respect to the longitudinal axis thereof so as to be able to be moved in the outer ring or inside the housing, in particular directly in or on the housing.

It is thereby possible to prevent the pivot loading, which acts as a counter-reaction as a result of the torsion of the torsion webs on the outer ring of the pivot ring, from having to be supported exclusively by the first bearing journal and the bearing location of the housing which cooperates therewith.

In such an embodiment of a steering gear mechanism according to the disclosure, the preferably cylindrical bearing journals may further be orientated coaxially with respect to the longitudinal axes thereof and/or rotatably supported with respect to the longitudinal axes thereof in the outer ring or inside the housing, in particular directly in or on the housing. As a result, a functionally advantageous pivotability of the pinion shaft about a rotation axis which is orientated perpendicularly to the pivot axis is also produced, which may have a positive effect with regard to the operational behavior of the steering gear mechanism.

According to an embodiment of a steering gear mechanism according to the disclosure which is advantageous from a structural point of view, there may be provision for the outer ring of the pivot ring to have a tubular portion, on which the bearing journal(s) is/are arranged. A structurally advantageous connection of the bearing journals to the outer ring is thereby produced. In particular, there may be provision for the bearing journal(s) to be received as separate component(s) (in each case) in an opening or recess of the tubular portion. In a particularly preferred manner, the bearing journal(s) may be commercially available roller members of roller bearings since in spite of high wear resistance and low tolerances they are available in a cost-effective manner. The bearing journals may in particular be retained inside the opening or recess of the tubular portion by means of a press-fit and/or adhesively bonded, welded or soldered.

The term "longitudinal axis" of a member or a hollow space which has a covering face which extends in a closed manner is intended to be understood to refer to the axis which connects the geometric centers of gravity of the different cross-sections of this covering face.

The disclosure also relates to a steering system which comprises at least one steering gear mechanism according to the disclosure and a steering motor which is connected to the pinion shaft in a rotationally driving manner. The gear of the steering gear mechanism may further be connected in a rotationally secure or rotationally driving manner to a steering shaft, in particular a steering column, of the steering system. The steering system according to the disclosure may in particular be constructed as a power-assisted steering system, by means of which a supporting torque can be produced using the steering motor so that a steering torque which has to be applied to the steering column by a driver of a motor vehicle which comprises the power-assisted steering system for steering the motor vehicle is reduced (where applicable, temporarily even up to zero). Alternatively, it is also possible for the steering system to be constructed in such a manner that the entire torque which is required for steering is (always) produced by the steering motor.

The disclosure further relates to a motor vehicle having a steering system according to the disclosure.

The indefinite articles ("a", "an", "of a" and "of an"), in particular in the patent claims and in the description which generally explains the patent claims, are intended to be understood per se and not as numerals. Components which are accordingly thereby specified are consequently intended to be understood in such a manner that they are present at least once and may be present several times.

BRIEF DESCRIPTION OF THE DRAWINGS

The disclosure is explained in greater detail below with reference to embodiments illustrated in the drawings, in which.

DETAILED DESCRIPTION

Figure 1:
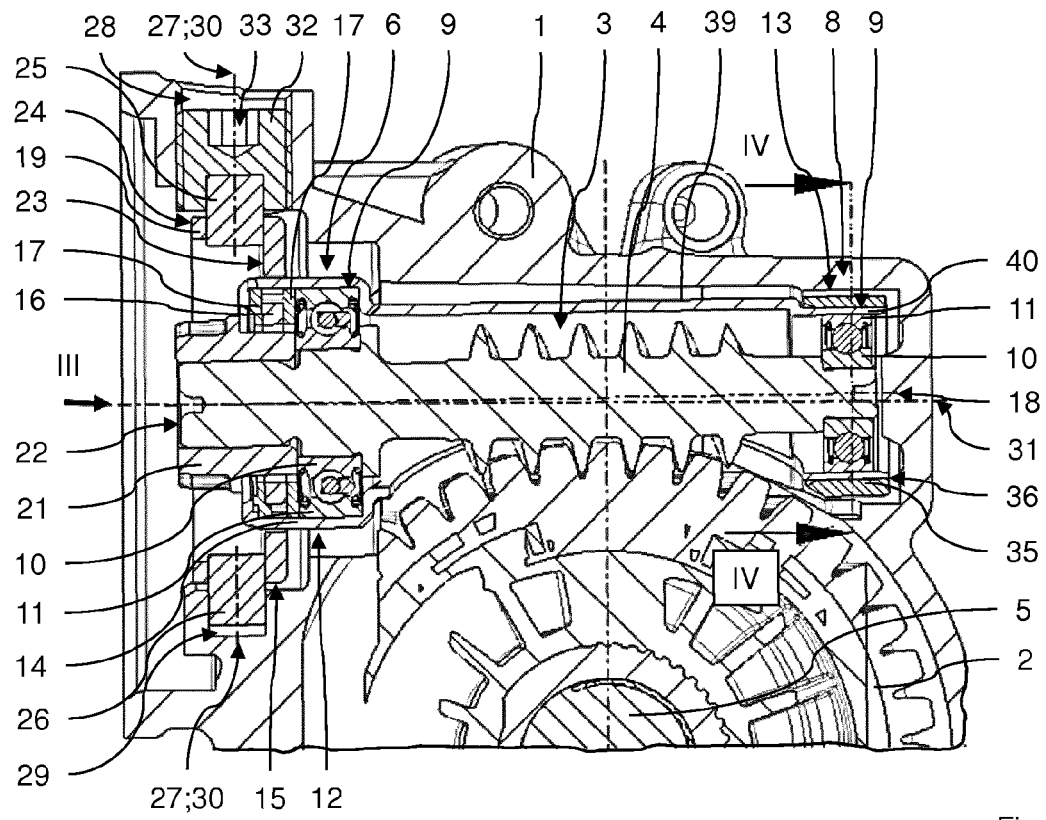
FIG. 1: is a longitudinal section through a steering gear mechanism according to the invention disclosure.

FIG. 1 shows the significant components of a steering gear mechanism according to the disclosure. It comprises a housing 1, inside which a gear 2 and a pinion 3 which meshes with the gear 2 and which is in the form of a helical pinion are rotatably arranged. The pinion 3 and a (helical) pinion shaft 4 which comprises the pinion 3 are constructed integrally in the form of a worm.

The gear 2 is securely fixed to an output shaft 5 of the steering gear mechanism. This output shaft 5 which in the embodiment shown has a tooth arrangement for a secure, rotationally fixed connection to the gear 2 may, for example, mesh with a steering rod which is formed in at least one portion as a toothed rack, whereby the toothed rack carries out a translational movement which in known manner can be converted by means of wheel steering levers (not illustrated) into a pivot movement of steerable wheels (not illustrated) of the motor vehicle. The output shaft 5 may, however, also be a steering column of a power-assisted steering system which is connected to a steering wheel and which acts via a steering pinion on the steering rod.

The pinion shaft 4 has a drive-side end, via which it can be connected in a rotationally secure manner to the output shaft of a steering motor (not illustrated; for example, an electric or hydraulic motor). In the region of this drive-side end, the pinion shaft 4 is supported by means of a first bearing in the housing 1. This bearing is constructed as a fixed bearing 6, which permits a pivoting of the pinion shaft 4 about a pivot axis 7 (cf. FIGS. 2 and 3). This pivot axis 7 extends in this instance in FIG. 1 perpendicularly to the drawing plane. Such a pivoting brings about a deflection of the end of the pinion shaft 4 opposite the drive-side end, which pinion shaft 4 is supported at that location by means of a movable bearing 8 within the housing 1. This movable bearing 8 is constructed in such a manner that it permits the deflection of this end of the pinion shaft 4, as results from the pivoting of the pinion shaft 4.

Both the fixed bearing 6 and the movable bearing 8 each comprise a rotary bearing 9 in the form of a ball bearing. The corresponding portions of the pinion shaft 4 are supported in inner bearing rings 10 of these rotary bearings 9, whilst external bearing rings 11 of the rotary bearings 9 are supported in a bearing device 12, 13 in each case which are in turn received within the housing 1. The bearing devices 12, 13 are structurally constructed in such a manner that they permit in the case of the fixed bearing 6, inter alia, the pivoting of the pinion shaft 4 about the pivot axis 7 and in the case of the movable bearing 8 the deflection of the free end of the pinion shaft 4.

To this end, the bearing device 12 of the fixed bearing 6 comprises a fixed bearing sleeve 14 with circular-ring-like cross-sections which receives at the inner side in a first longitudinal portion the associated rotary bearing 9 and in a second longitudinal portion an inner ring 16 of a pivot ring 15. This inner ring 16 of the pivot ring 15 and the outer bearing ring 11 of the rotary bearing 9 of the fixed bearing 6 are supported so as to be axially secured within the fixed bearing sleeve 14 with two annular disks 17 being interposed, wherein the inner ring 16 of the pivot ring 15 is supported, with the annular disks 17 being interposed, on the one hand, on the outer bearing ring 11 of the rotary bearing 9 and, on the other hand, on a first peripheral shoulder which is formed by the fixed bearing sleeve 14 at an axial end. In the same manner, the side of the outer bearing ring 11 of the rotary bearing 9, which side is distally located from the inner ring 16 of the pivot ring 15, is supported on a second, peripheral shoulder which is formed by the fixed bearing sleeve 14 at the other axial end.

The pivot ring 15 also comprises in addition to the inner ring 16 an outer ring 19. This outer ring 19 is connected to the inner ring 16 by means of two torsion webs 20 (cf. FIGS. 2 and 3). The outer ring 19, the inner ring 16 and the torsion webs 20 are constructed integrally, for example, from spring steel.

The two torsion webs 20 define the position of the pivot axis 7, about which the outer ring 19 can be pivoted relative to the inner ring 16 of the pivot ring 15. The torsion webs 20 of the pivot ring 15 enable in this instance not only a pivoting of the outer ring 19 relative to the inner ring 16 and consequently of the pinion shaft 4 relative to the gear 2 or the housing 1, but also bring about at the same time the resilient force by means of which the pinion 3 is pressed into the tooth arrangement of the gear 2 in order to achieve the smallest possible gear play and consequently the smallest possible generation of noise during operation of the steering gear mechanism, in particular during alternating steering. This resilient force results from the fact that, during the assembly of the steering gear mechanism, the pinion shaft 4 is deflected as a result of contact with the gear 2 to such an extent that sufficient twisting (torsion) of the torsion webs 20 is produced, whereby the resilient restoring torques which result from this torsion of the torsion webs 20 counteract the deflection of the pinion shaft 4 and consequently urge it against the gear 2.

An axial position fixing of the inner bearing ring 10 of the rotary bearing 9 of the fixed bearing 6 on the pinion shaft 4 and the components which are arranged within the fixed bearing sleeve 14 is carried out with there being interposed a pressure piece 21 which is in abutment with the inner bearing ring 10 and which is screwed to a threaded portion 22 at the drive-side end of the pinion shaft 4.

The outer ring 19 of the pivot ring 15 is constructed in a pot-like manner and accordingly comprises a radially extending portion 23 and an axially extending tubular portion 24 with circular-ring-like cross-sections. The tubular portion 24 extends in this instance from the side of the radially extending portion 23 of the outer ring 19 of the pivot ring 15, which side faces away from the rotary bearing 9. In the region of the tubular portion 24, the wall of the outer ring 19 of the pivot ring 15 forms two radially or diametrically opposing through-openings, in which a cylindrical bearing journal 25, 26 is received in a fixed manner. The bearing journals 25, 26 whose longitudinal axes 27 are orientated coaxially with respect to each other protrude in this instance over the outer side of the wall of the outer ring 19 of the pivot ring 15. The bearing journals 25, 26 protrude with these portions into bearing receiving members 28, 29 of the housing 1 in order to ensure, on the one hand, a rotatability of the bearing device 12 with respect to a rotation axis 30 which is orientated perpendicularly, on the one hand, to the longitudinal axis 31 of the outer ring 19 and, on the other hand, the pivot axis 7. On the other hand, these bearing journals 25, 26 are components of an adjustment device of the steering gear mechanism, by means of which the position of the outer ring 19 of the pivot ring 15 can be adjusted within the housing 1 with respect to the directions which correspond to this rotation axis 30.

The fixing of the bearing journals 25, 26 within the through-openings of the wall of the outer ring 19 of the pivot ring 15 is selected to be non-releasable and may in particular be carried out in a materially engaging manner, for example, by means of welding, soldering or adhesive bonding. Non-positive-locking (for example, by means of a press-fit) and positive-locking connection (for example, by means of a screw connection), then where applicable also releasable connection variants are also possible.

The adjustment device further comprises in addition to the two bearing journals 25, 26 a threaded element 32, which forms an outer thread which cooperates with an inner thread of a first (28) of the bearing receiving members of the housing 1. At the end face facing the outer side of the housing 1, the threaded element 32 forms a recess 33 which is hexagonal in cross-section and in which there can be inserted a corresponding tool (not illustrated) by means of which a torque can be transmitted to the threaded element 32, whereby the threaded element 32, as a result of a cooperation of the outer thread thereof with the inner thread (counter-thread) of the first bearing receiving member 28 can be moved along the longitudinal axis 27 of the first bearing receiving member 28 which extends coaxially relative to the longitudinal axes 27 of the bearing journals 25, 26. At the end face facing the inner side of the housing 1, the threaded element 32 also forms a recess which is cylindrical or circular in cross-section and in which an end portion of a first (25) of the bearing journals engages in a play-free manner to the greatest possible extent.

If the threaded element 32, when viewed from the outer side of the housing 1, is screwed further into the first bearing receiving member 28, this movement of the threaded element 32 is transmitted to the first bearing journal 25 and from there to the outer ring 19 of the pivot ring 15 and to the second bearing journal 26 which in this instance is displaced in a longitudinally axial manner in the second bearing receiving member 29 of the housing 1 which is also constructed in a cylindrical manner and with an only slightly larger diameter in comparison with the second bearing journal 26.

The displacement of the outer ring 19 and consequently of the pivot ring 15 brought about by such a screwing-in action of the threaded element 32 into the first bearing receiving member 28 leads as a result of the support of the pinion 3 on the gear 2 to a pivoting of the pinion shaft 4. This pivoting of the pinion shaft 4 and of the connected inner ring 16 of the pivot ring leads at the same time to an increasing torsion of the torsion webs 20 since the outer ring 19 of the pivot ring 15 cannot follow this pivot movement of the inner ring 16 since the bearing of the bearing pins 25, 26 in the bearing receiving members 28, 29 of the housing 1 does not permit such a pivot movement of the outer ring 19.

If, however, the threaded element 32 is unscrewed to a small extent from the first bearing receiving member 28, the resilient application of the pinion shaft 4 results in the outer ring 19 with the two bearing pins 25, 26 following the movement of the threaded element 32, whereby the torsion of the torsion webs 20 and consequently the resilient application of the pinion shaft 4 is reduced. Accordingly, as a result of a change of the position of the outer ring 19 of the pivot ring 15 within the housing 1 with respect to the directions mentioned, the resilient application of the pinion shaft 4 can be adjusted.

The bearing device 13 of the movable bearing 8 comprises a stop element in the form of a stop sleeve 35 which is arranged to be able to be moved within a receiving space 36 formed by the housing 1 in such a manner that, within the limits of a structurally defined basic play, the pivoting movability about the pivot axis 7 defined or formed by the fixed bearing 6 is possible. In this instance, this movability is limited in one direction by a contact which is complete or which occurs on two flanks of the individual teeth of the pinion 3 and gear 2 and which is brought about by the resilient loading by means of the twisted torsion webs 20 and, in the other direction, by a stop which is brought about by means of a contact of contact faces 37, 38 which are formed, on the one hand, by the stop sleeve 35 and, on the other hand, by the wall of the housing 1 which delimits the receiving space 36.

Details relating to the structure and operation of the movable bearing 8 can be derived from the subsequently published German patent application DE 10 2017 211 461.4.

Figure 2:
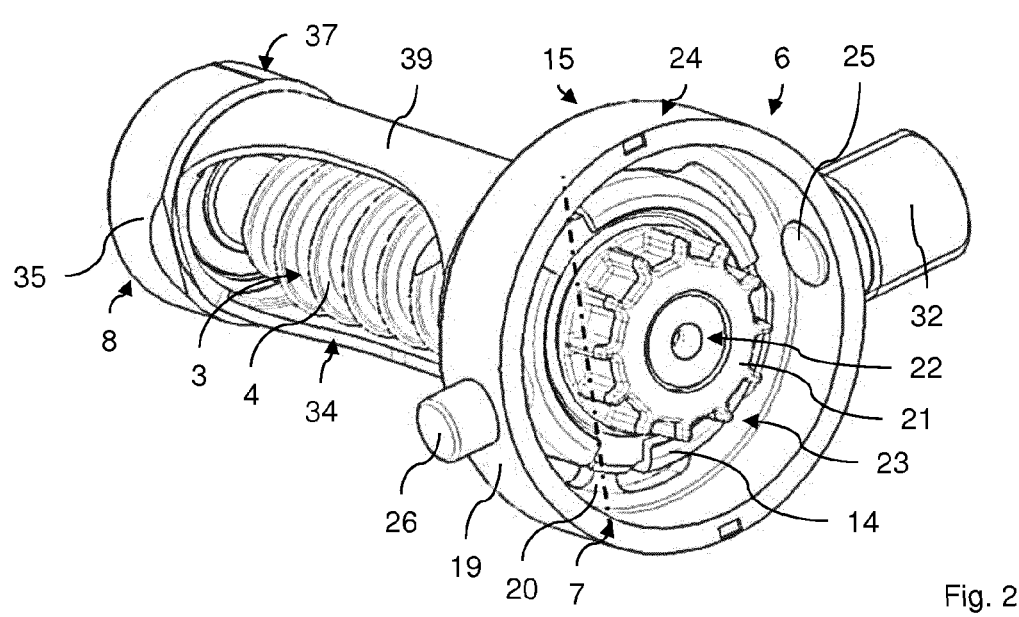
FIG. 2: is a perspective view of a bearing device of a fixed bearing and a movable bearing and a pinion shaft of the steering gear mechanism according to FIG. 1.
Figure 3:
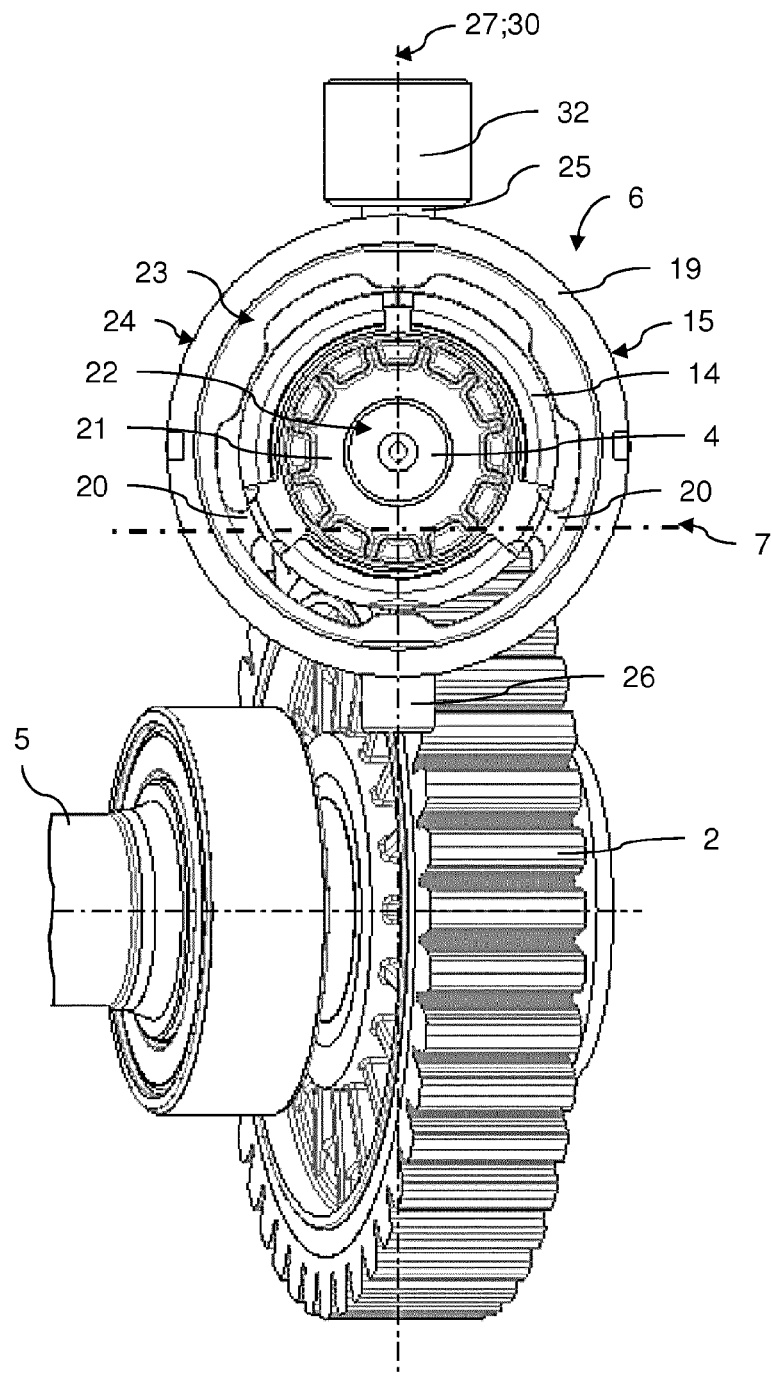
FIG. 3: is a view of the steering gear mechanism without the associated housing in the viewing direction III in FIG. 1.
Figure 4:
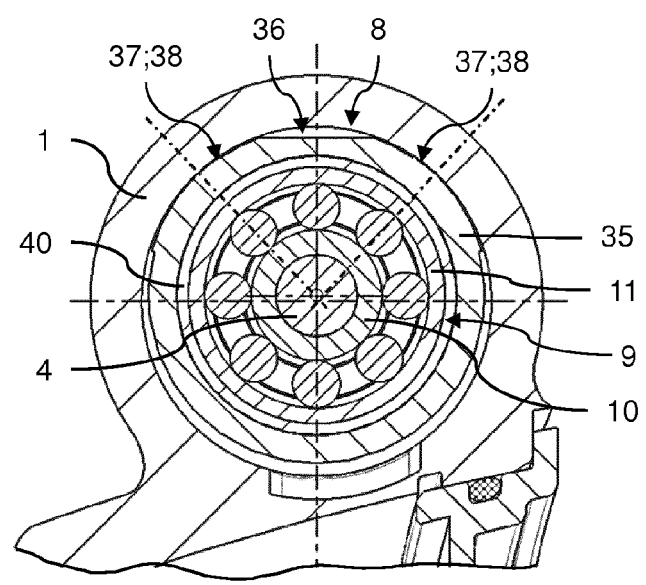
FIG. 4: is a cross-section through the steering gear mechanism along the plane of section Iv-Iv in FIG. 1.

The steering gear mechanism further comprises a connection element 39 which connects the fixed bearing sleeve 14 to a movable bearing sleeve 40 of the movable bearing 8 and to this end is constructed in an integral and materially uniform manner with the bearing sleeves 14, 40. As can be seen in FIGS. 1 and 2, the connection element 39 is constructed in a tubular manner with circular-ring-like or partially circular-ring-like cross-sections, wherein it has a covering opening 34 which is arranged in a central portion of the connection element 39 and which extends over a portion of the periphery thereof. As a result of this covering opening 34, a portion of the gear 2 may protrude into the inner space which is delimited by the connection element 39 and which receives the pinion shaft 4 in the portion which inter alia forms the pinion 3 in order to allow an engagement of the tooth arrangements of the gear 2 and the pinion 3.

The connection element 39 results, on the one hand, in the resilient restoring torques which result from the torsion of the torsion webs 20 of the pivot ring 15 of the fixed bearing 6 not being transmitted exclusively via the rotary bearing 9 of the fixed bearing 6 to the pinion shaft 4, which would be linked with a relatively high tilting loading of this rotary bearing 9. Instead, these resilient restoring torques are transmitted primarily via the fixed bearing sleeve 14 of the fixed bearing 6 and the integrally connected connection element 39 and via the movable bearing sleeve 40 to the rotary bearing 9 of the movable bearing 8. On the other hand, as a result of the connection element 37, a relative rotation between the fixed bearing sleeve 14 and the movable bearing sleeve 40 about the longitudinal axes 18 thereof is prevented.

LIST OF REFERENCE NUMERALS

1 Housing
2 Gear
3 (Helical) pinion 4 (Helical) pinion shaft
5 Output shaft
6 Fixed bearing
7 Pivot axis
8 Movable bearing
9 Rotary bearing
10 Inner bearing ring of a rotary bearing
11 Outer bearing ring of a rotary bearing
12 Bearing device of the fixed bearing
13 Bearing device of the movable bearing
14 Fixed bearing sleeve
15 Pivot ring
16 Inner ring of the pivot ring
17 Annular disk
18 Longitudinal axes of the fixed bearing sleeve/movable bearing sleeve/pinion shaft
19 Outer ring of the pivot ring
20 Torsion web
21 Pressure piece
22 Threaded portion of the pinion shaft
23 Radially extending portion of the outer ring
24 Axially extending portion of the outer ring
25 First bearing journal
26 Second bearing journal
27 Longitudinal axis of a bearing journal/a bearing receiving member
28 First bearing receiving member of the housing
29 Second bearing receiving member of the housing
30 Rotation axis
31 Longitudinal axis of the outer ring
32 Threaded element
33 Recess of the threaded element
34 Covering opening of the connection element
35 Stop sleeve
36 Receiving space of the housing
37 Contact face of the stop sleeve
38 Contact face of the housing
39 Connection element
40 Movable bearing sleeve

The invention claimed is:

1. A steering gear mechanism for a steering system of a motor vehicle, comprising:
a housing,
a gear, and
a pinion shaft which comprises a pinion that meshes with the gear,
wherein the pinion shaft is supported at one side of the pinion in a fixed bearing, which comprises a rotary bearing in which the pinion shaft is received and which is received in a fixed bearing sleeve
wherein the fixed bearing further comprises a pivot ring which has an outer ring and an inner ring which are connected to each other by way of one or more torsion webs so as to be able to be pivoted about a pivot axis which is defined by the torsion webs,
wherein the inner ring is received in the fixed bearing sleeve and the outer ring is supported inside the housing, and
wherein an adjustment device by way of which a position of the outer ring of the pivot ring is adjustable within the housing with respect to the directions which are orientated perpendicularly to longitudinal axis of the outer ring and the pivot axis.

2. The steering gear mechanism as claimed in claim 1, wherein:
the adjustment device comprises a first bearing journal having a longitudinal axis that is perpendicular to the longitudinal axis of the outer ring and to the pivot axis and which connects the outer ring of the pivot ring to a bearing location of the housing, and
the bearing location comprises means for fixing the first bearing journal in different positions with respect to the longitudinal axis thereof.

3. The steering gear mechanism as claimed in claim 2, wherein the means for fixing the first bearing journal comprises a threaded element which has a thread which cooperates with a counter-thread of the bearing location.

4. The steering gear mechanism as claimed in claim 2, wherein a second bearing journal is arranged radially opposite the first bearing journal with respect to the longitudinal axis of the outer ring and is supported so as to be movable along the longitudinal axis thereof in the outer ring or in the housing.

5. The steering gear mechanism as claimed in claim 4, wherein the first bearing journal and the second bearing journal are orientated coaxially.

6. The steering gear mechanism as claimed in claim 4, wherein the first bearing journal and the second bearing journal are rotatably supported about the longitudinal axis of the outer ring in the outer ring or in the housing.

7. The steering gear mechanism as claimed in claim 4, wherein the outer ring of the pivot ring has a tubular portion on which the first bearing journal and the second bearing journal are arranged.

8. The steering gear mechanism as claimed in claim 7, wherein the first bearing journal and the second bearing journal are received as separate components in an opening or recess of the tubular portion.

9. The steering gear mechanism as claimed in claim 1, wherein:
the pinion shaft is supported at another side of the pinion in a movable bearing which comprises a rotary bearing in which the pinion shaft is received, and
for the rotary bearing a movability inside the housing with regard to the pivoting movability of the pinion shaft which is guided by the fixed bearing is ensured.

10. A steering system having a steering gear mechanism as claimed in claim 1 and having a steering motor which is connected to the pinion shaft of the steering gear mechanism in a rotationally driving manner.

* * * * *